United States Patent [19]

Ishida

[11] Patent Number: 5,684,969
[45] Date of Patent: Nov. 4, 1997

[54] INFORMATION MANAGEMENT SYSTEM FACILITATING USER ACCESS TO INFORMATION CONTENT THROUGH DISPLAY OF SCALED INFORMATION NODES

[75] Inventor: Eiji Ishida, Kanagawa, Japan

[73] Assignee: Fuji Xerox Co., Ltd., Tokyo, Japan

[21] Appl. No.: 614,104

[22] Filed: Mar. 12, 1996

Related U.S. Application Data

[63] Continuation of Ser. No. 389,748, Feb. 14, 1995, abandoned, which is a continuation of Ser. No. 903,283, Jun. 24, 1992, abandoned.

[30] Foreign Application Priority Data

Jun. 25, 1991 [JP] Japan ................................. 3-178871
Dec. 29, 1991 [JP] Japan ................................. 3-359696

[51] Int. Cl.$^6$ ........................................... G06T 3/40
[52] U.S. Cl. ........................................ 395/342; 395/139
[58] Field of Search ............................ 395/155–161, 395/144, 139, 335, 342, 346, 762; 345/115, 127, 129, 130

[56] References Cited

U.S. PATENT DOCUMENTS

| | | | |
|---|---|---|---|
| 5,021,976 | 6/1991 | Wexelblat et al. | 395/356 |
| 5,060,170 | 10/1991 | Bourgeois et al. | 395/342 |
| 5,073,771 | 12/1991 | Satta et al. | 345/115 X |
| 5,261,041 | 11/1993 | Susman | 395/122 X |
| 5,262,761 | 11/1993 | Scandura et al. | 395/346 X |
| 5,305,435 | 4/1994 | Bronson | 395/351 |
| 5,321,800 | 6/1994 | Lesser | 395/140 |

OTHER PUBLICATIONS

Jensen, Harvard Graphics: The Complete Reference, 1990, pp. 304–305 and 318–319, 1990.

Halasz, F.G., "Reflections on NoteCards: Seven Issues for the Next Generation of Hypermedia Systems", Communications of the ACM. vol. 31, No. 7, Jul. 1988, pp. 836–852.

Conklin, Jeff and Begeman, Michael L. "gIBIS: A Hypertext Tool for Exploratory Policy Discussion", CSCW 88 Proceedings, pp. 140–152, Sep. 1988.

Henderson, D. Austine, Jr., and Card, Stuart K., "Rooms: The Use of Multiple Virtual Workspaces to Reduce Space Contention in a Window–Based Graphical User Interface", ACM Transactions on Graphics, vol. 5, No. 3, Jul. 1986, pp. 211–243.

Trigg, R.H., "Guided Tours and Tabletops: Tools for Communication in a Hypertext Environment", ACM Transactions on Office Information Systems, vol. 6, Oct. 1988, pp. 398–414.

*Primary Examiner*—Anton W. Fetting
*Attorney, Agent, or Firm*—Finnegan, Henderson, Farabow, Garrett & Dunner, L.L.P.

[57] ABSTRACT

An information grasping system in which information is described as nodes, and the nodes are allocated in the virtual plane, and a user can easily grasp' the relationship between the whole information and the detailed information in a single display area while continuously zooming in and out the nodes, and easily grasp significance data. A virtual-plane-data managing unit generates and manages virtual plane data for allocating and displaying in a virtual plane the data entered by a user in various display modes, which are according to display rules stored in a rule storage unit. The system automatically calculates significance of nodes on the basis of the user's operation data of nodes. The nodes are discriminatively displayed according to the significance in the virtual plane.

9 Claims, 27 Drawing Sheets

FIG. 3

| NODE SIZE | ~STD | STD~1/2 | 1/2~1/3 | 1/3~1/4 | 1/4~1/10 | 1/10~1/20 | 1/20~ |
|---|---|---|---|---|---|---|---|
| CHARACTER | PLURAL FONTS/ MODIFIER | SINGLE FONT/NO MODIFIER | RECTANGULAR DISPLAY AT EACH CHARACTER POSITION | RECTILIN- EAR | EXISTENCE AREA | EXISTENCE | NO INFORMA- TION |
| GRAPHICS | DISPLAY ALL ATTRIBUTES | DISPLAY ALL ATTRIBUTES | OMIT ATTRIBUTES AND DISPLAY FIGURES | OMIT ATTRIBUTES AND DISPLAY FIGURES | EXISTENCE AREA | EXISTENCE | NO INFORMA- TION |
| TABLE | DISPLAY ALL CONTENTS | SINGLE FONT/NO MODIFIER | DISPLAY FIGURE OF TABLE ONLY | DISPLAY FIGURE OF TABLE ONLY | EXISTENCE AREA | EXISTENCE | NO INFORMA- TION |

FIG. 4

| NODE SIZE | ~STD | STD~1/2 | 1/2~1/3 | 1/3~1/4 | 1/4~1/10 | 1/10~1/20 | 1/20~ |
|---|---|---|---|---|---|---|---|
| SMALL TITTLE (CHARACTER) | NO ALTERATION | NO ALTERATION | SINGLE FONT/NO MODIFIER | NO ALTERATION | NO ALTERATION | NO ALTERATION | NO ALTERATION |
| LARGE TITTLE (CHARACTER) | NO ALTERATION | NO ALTERATION | SINGLE FONT/NO MODIFIER | SINGLE FONT/NO MODIFIER | SINGLE FONT/NO MODIFIER | NO ALTERATION | NO ALTERATION |
| TABLE TITTLE (CHARACTER) | NO ALTERATION | NO ALTERATION | SINGLE FONT/NO MODIFIER | SINGLE FONT/NO MODIFIER | NO ALTERATION | NO ALTERATION | NO ALTERATION |

FIG. 5

| NODE SIZE | ~STD | STD~1/2 | 1/2~1/3 | 1/3~1/4 | 1/4~1/10 | 1/10~1/20 | 1/20~ |
|---|---|---|---|---|---|---|---|
| NODE MOVEMENT | ... | ○ | ○ | ○ | ○ | ○ | ○ |
| NODE COPY | ... | ○ | ○ | ○ | ○ | ○ | ... |
| NODE NAME CHANGE | ... | ○ | ○ | ○ | ○ | ○ | ... |
| DATA MOVEMENT BETWEEN NODES | ... | ○ | ○ | ○ | ○ | ... | ... |
| CHARACTER EDIT | ○ | ○ | ... | ... | ... | ... | ... |
| CHARACTER ATTRIBUTE ALTERATION | ○ | ... | ... | ... | ... | ... | ... |
| LOGICAL STRUCTURE EDIT | ... | ... | ○ | ○ | ○ | ... | ... |
| GRAPHICS EDIT | ○ | ○ | ○ | ○ | ... | ... | ... |
| GRAPHICS ATTRIBUTE ALTERATION | ○ | ○ | ... | ... | ... | ... | ... |
| TABLE UNIT | ○ | ○ | ... | ... | ... | ... | ... |

FIG. 7b
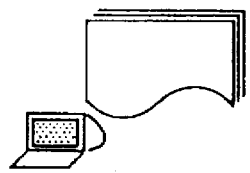
ADVANTAGES
OUR NEW MODEL HAS
    FOLLOWING ADVANTAGES:
1) Higiher Speed
2) Better Economy
3) More Safety
4) Lower Price
Comparison
|      | Speed | Economy | Safety | Price |
|------|-------|---------|--------|-------|
| Ours | 120   | 12      | 0.1    | 198   |
| A    | 110   | 6       | 0.3    | 268   |
| B    | 45    | 5       | 0.2    | 218   |
100% ~ 1/2
FIG. 7c
ADVANTAGES
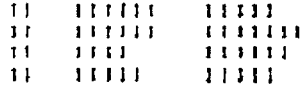
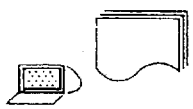
1/2 ~ 1/3

1/3~1/4

1/4~1/10

1/10~1/20

1/20~

1/2~1/3

1/3~1/4

1/4~1/10

1/10~1/20

1/20

100% ~ 1/2

1/2 ~ 1/3

1/3~1/4

1/4~1/10

1/10~1/20

1/20~

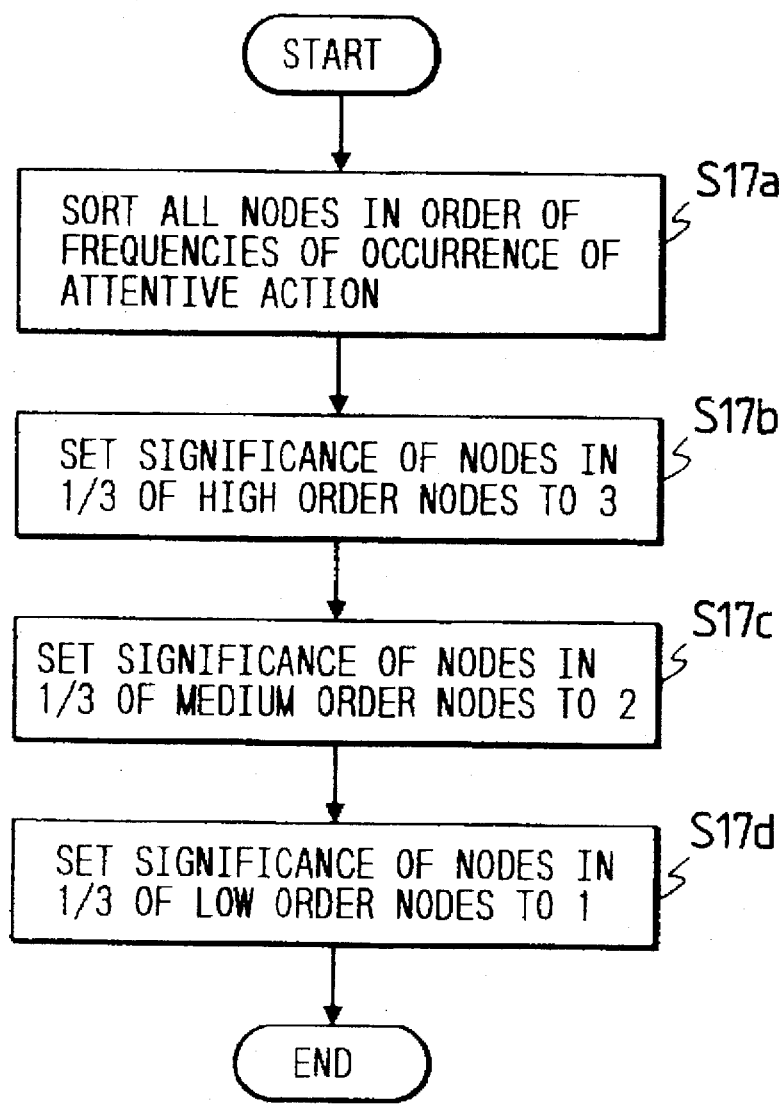

FIG. 19

| NODE ID | X | Y |
|---|---|---|
| 0001 | 223 | 245 |
| 0002 | 334 | 31 |
| 0003 | 123 | 351 |
| 0004 | 24 | 256 |
| 0005 | 153 | 155 |

FIG. 20

| NODE ID | ATTENTIVE ACTION (TIMES) |
|---|---|
| 0001 | 624 |
| 0002 | 756 |
| 0003 | 3 |
| 0004 | 124 |
| 0005 | 23 |

FIG. 21

| NODE ID | SIGNIFICANCE |
|---|---|
| 0001 | 2 |
| 0002 | 3 |
| 0003 | 1 |
| 0004 | 2 |
| 0005 | 1 |

INFORMATION MANAGEMENT SYSTEM FACILITATING USER ACCESS TO INFORMATION CONTENT THROUGH DISPLAY OF SCALED INFORMATION NODES

This application is a continuation of application Ser. No. 08/389,748 filed Feb. 14, 1995, now abandoned, which is a continuation of application Ser. No. 07/903,283 filed Jun. 24, 1992, now abandoned.

BACKGROUND OF THE INVENTION

1. Field of the Invention

The present invention relates to an information management system in which information is described in information nodes, such that a user arranges, understands, and edits the information using the nodes. More particularly, the invention relates to an apparatus for automatically providing information for navigation, which is expressed in terms of significance of information nodes, to a user when he arranges, understands, and edits information using the information management/edit system.

2. Description of the Related Art

For the prior techniques in this field, the following articles may be enumerated:

Article 1: Halasz, F. G., "Reflections on NoteCards: Seven Issues for the Next Generation of Hypermedia Systems", Communications of the ACM, Vol. 31, No. 7, July 1988, pp.836–852.

Article 2: Coklin, Jeff and Begeman, Michael L. "gIBIS: A Hypertext Tool for Exploratory Policy Discussion", CSCW 88 Proceedings, pp. 140–152, September 1988.

Article 3: Henderson, D. Austine, JR., and Card, Stuart K., "Rooms: The Use of Multiple Virtual Workspaces to Reduce Space Contention in a Window—Based Graphical user Interface", ACM Transactions on Graphics, Vol., 5. No. 3, July 1986, pp. 211–243.

The articles 1 and 2 describe the browse techniques in hypertext, and the article 3 describes a technique in a computer working environment.

In the browse technique in the hypertext technique, such as NoteCards and gIBIS, information can be described in a manner in which information entities are allocated as nodes in a virtual plane. The detailed contents of the nodes can also be displayed. A "browse" function displays the allocation of nodes in the whole virtual plane as a node.

In the screen display technique in the NoteCards, the detailed contents are displayed in a window, and a browse showing a node allocation in a virtual plane is displayed in the left window.

In the screen display technique of gIBIS, the detailed contents are displayed in the right window in the screen, and the browse showing the node allocation in the virtual plane is displayed in the left window.

In the work environment technique of Rooms, for example, information can be allocated in the form of an icon in the virtual plane. The technique includes a function to display the detailed contents of information entity, and the function to display the allocation of information entities in the whole virtual plane.

Prior techniques are described in "Guided Tours & Table Tops" in Article 4: Trigg, R. H., "Guided Tours and Tabletops: Tools for Communication in a Hypertext Environment", ACM Transactions on Office Information systems, Vol. 6, October 1988, pp. 398–414.

Hypertext navigation and a browse technique for automatically generating navigation information on the basis of past action data of a user is described in Article 5: Eiji Ishida and Motohira Azuma, "Improved Browse for Solving Lost Information Problem in the Hypertext", Information Processing Academy, First-Term National Convention of Heisei 2, March 1990, pp. 1499–1500.

"Guided Tours & TableTops" (article 4) describes a technique in which a writer who writes a hypertext provides navigation information which assists the user in his access to the hypertext. In the article, a display method of displaying a group of nodes called tabletops and access paths called guided tours connecting the tabletops are presented to the user. The tabletops are used so that a hypertext writer describes the locations on the display screen where specific nodes contained in the hypertext are displayed. With use of the tabletops, a user can understand a set of related nodes at a glance. The guided tours describes the order in which the user traces the tabletops. The user may follow the path or cease the use of the path.

In article 5, which "automatically generates navigation information on the basis of past action data of a user," navigation data picked up from user's action data on his past access is generated and supplied to the user. The technique is designed to minimize the load upon a writer of the hypertext, and supply to the user information closest to the navigation data that the writer will supply to the user. A key idea to realize this is "user's action during his past access to the hypertext is recorded, and navigation data is formed on the basis of the action data and is supplied to a new user." The navigation information, like dog-ears, thumb marks, underlines, notes, etc. in books or texts used by many people, gives new user keys information for understanding the hypertext. The information given is "significance of node/link," "related node group," and "registered access path." The "significance of node/link" indicates relative significance of the respective node/links. The "related node group" is information on a group of related nodes. The "registered access path" is information to indicate the access path that is considered to be the best to achieve an object.

In the conventional techniques of the articles 1, 2 and 3, the display area for displaying the detailed information is different from that for displaying the overall allocation in the virtual plane. Therefore, a user must imaginarily connect the detailed information and the overall allocation in the virtual plane while imaginarily comparing the displayed detailed information and the displayed whole allocation. This work requires much mental strain of the user when he grasps or edits the information thus allocated in the virtual plane.

The conventional techniques suffer from the following problems of navigation.

In "Guided Tours & Tabletops" (article 4), when a user makes an access to nodes allocated in the virtual plane, information for the navigation is added by a writer of the information. The navigation information includes two types of information: one showing how nodes called tabletops are allocated for presentation and the other showing the order in which a plurality of tabletops called guided tours are presented. This method enables the user to effectively understand the information described in the virtual plane. However, the writer must prepare the information, tabletops and guided tours. Such preparation involves a large amount of work for the writer. When the data is updated, the navigation data must be formed anew.

In article 5, which "automatically generates navigation information on the basis of past action data of a user,"

significance information of each node is formed on the base of a frequency of user's past accesses to the node, and is supplied as navigation data to the user. The user selects the node that seems to be significant, using the navigation information, and accesses the node selected. This method is advantageous in that the navigation data can be presented to the user without bothering the writer. However, it is disadvantageous in that the significance data is not reliable. The significance data is not reliable because it is based on very simple action data of the frequency of the accesses to the nodes. A mistaken access by the user is also recorded as necessary action data.

SUMMARY OF THE INVENTION

Accordingly, it is an object of the present invention to display the detailed information and the general information in a single display area.

In a conventional technique to display the general information and the detailed information in a single display, the display contents are not changed according to the logical structure within the node. Accordingly, the present invention has another object to change the display contents according to the logical structure within the node.

In the conventional technique to display the general information and the detailed information in a single display, an edit function which depends on the display contents, is not provided. Accordingly, the present invention has a further object to provide an edit function which depends on the display contents.

It is still another object to provide highly reliable significance information to the user.

A first embodiment of an information management system according to the present invention comprises: virtual-plane-data managing means for generating and managing a virtual plane in which an information writer describes nodes and a user grasps the nodes; rule storage means for storing the rules for displaying the virtual plane; display means for displaying a virtual plane; virtual scale-factor input means for entering a scale factor for displaying a virtual plane; and central processing means for processing and controlling the data flowing in the overall information management system.

A second embodiment of the invention comprises the virtual-plane-data managing means including logical structure storage means for storing the logic structure in each node, and the rule storage means including logic-structure-display-rule storage means for storing the rules for the display corresponding to the logic structure.

A third embodiment of the invention comprises the rule storage means including edit-function-select-rule storage means for selecting edit functions according to display states, and edit processing means for providing edit functions according to the edit function select rules is further provided.

A fourth embodiment of the invention comprises the virtual-plane-data managing means including attentive action pick-up means for picking up from the past action data of a user attentive action data substantially indicating that the user actually referred to the nodes, and significance data generating means for calculating significance data of nodes on the basis of the picked up attentive action data, whereby a virtual plane containing the node significance data is displayed by the display means.

A fifth embodiment of the invention is equivalent to the information management system of the first embodiment so modified that the rule storage means is omitted, and the virtual plane is enlarged or diminished in a simple manner so that an image is enlarged or diminished, and as to further include attentive action pick-up means for picking up from the past action data of a user on his scale factor entering operation, attentive action data substantially indicating that the user actually referred to the node, and significance data generating means for calculating significance data of nodes on the basis of the picked up attentive action data.

In the first embodiment, the virtual-plane-data managing means generates and manages virtual plane data for allocating and displaying the data entered by a user in a virtual plane in various display modes which are set up according to the display rules stored in the rule storage means. More specifically, the data of each node allocated in a virtual plane is divided into position data and node content data, which in turn are stored into a virtual plane-position-data storage portion and a content data storage portion. The virtual-plane-data managing means includes a virtual-plane data generator for generating virtual plane data. The generator alters the display of node data according to the display rules, which are stored in a display rule storage portion, and then stores it into the virtual-plane-position-data storage portion. Further, it forms data to be stored into a diminishing-display data storage portion and another diminishing-display data storage portion. Subsequently, the processing is repeated until the diminishing-display data storage portion.

When a user enters a scale factor from the virtual scale-factor input means, the central processing means sends the received data to the virtual-plane-data managing means. The virtual-plane-data managing means picks up virtual plane data fit to the scale factor from the virtual plane data (various diminishing data) generated and stored as previously, according to the display rules for the virtual plane stored in the rule storage means. The virtual plane data picked up is transferred through the central processing means to the display means which in turn visually presents the data.

More specifically, in the embodiments to be described later, the scale factor entered is sent to the virtual-plane data retriever in the virtual-plane-data managing means. The virtual-plane-data retriever searches the virtual-plane-position-data storage portion on the basis of display area data, to obtain the data of the nodes to be displayed. Then, a level of the data storage portion is determined on the basis of the scale factor data. Display content of the indented node data stored in the data storage portion of which the level is determined is obtained, and is transferred back to the central processing means. The central processing means sends the data received to the display generator. In turn, the display generator composes the data into graphics which then is displayed by the display.

In the second embodiment, the logical structure in the node is stored into the logical structure storage means when the data of the nodes allocated in the virtual plane are stored. The virtual-plane-data managing means (exactly virtual-plane data generator) generates display data on the basis of the logical structure data stored in the logical structure storage means and according to the logical structure display rules stored in the logic-structure-display-rule storage means, in addition to the display rules of the first embodiment. The display data generated is stored into the diminishing-display data storage portions (1) to (N) in the embodiments to described later. Subsequently, the display job is executed, and graphics based on the logical structure are displayed by the display means.

In another embodiment, edit function select rules for providing the edit function suitable for the display are stored into the edit-function-select-rule storage means. On the basis of the edit function select rules, the edit function is selected from among the (edit) functions (1) to (n), and is presented to a user. In this way, the user can use the edit function suitable for the display state.

In the other embodiment, a user can zoom in and out to a desired position in the virtual plane, through the virtual scale-factor input unit. The virtual-plane-data managing means, when receiving an instruction, sends data necessary for display to the display means. Then, the display means composes the data into graphics in such a form as to discriminate the significance of each node, and displays the graphics. User's instruction on those displays is transferred to the attentive action pick-up means. The attentive action pick-up means sorts the user's action data into the data of attentive action (considered as the action of the user that he referred to the nodes) and the data of unattentive action (mistaken operation by the user and mere glance during the retrieval operation), and only the attentive action data is recorded. The sorting of the action data may also be made on the basis of the zoom-in/out to the nodes. In the attentive action, it is considered that various parts in the node are zoomed in. In the unattentive action, it is considered that if the user zooms in the node and understands the content thereof, he zooms out thereof. The system utilizes this difference for discriminating the attentive action from the unattentive action. The significance data calculating portion calculates the significance of each node on the basis of the accumulated data of the action record. The virtual plane, when displayed again on the basis of the calculation result, contains the significance that is calculated using the user's action data.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIG. 3 is a Table exemplarily showing display rules;

FIG. 4 is a Table exemplarily showing logical structure display rules;

FIG. 5 is a Table exemplarily showing edit rule select rules;

FIGS. 7a through 7g exemplarily showing a process of the diminishing display generation. FIG. 7a is a diagram showing an undiminished 100% display.

FIG. 7b is a diagram showing a diminishing display in the range between 100% and ½;

FIG. 7c is a diagram showing a diminishing display in the range between ½ and ⅓;

FIG. 7d is a diagram showing a diminishing display in the range between ⅓ and ¼;

FIG. 7e is a diagram showing a diminishing display in the range between ¼ and 1/10;

FIG. 7f is a diagram showing a diminishing display in the range between 1/10 and 1/20;

FIG. 7g is a diagram showing a diminishing display in the range between 1/20 and less;

FIG. 9a is a diagram showing an undiminished 100% display;

FIG. 9b is a diagram showing a diminishing display in the range between 100% and ½;

FIG. 9c is a diagram showing a diminishing display in the range between ½ and ⅓;

FIG. 9d is a diagram showing a diminishing display in the range between ⅓ and ¼;

FIG. 9e is a diagram showing a diminishing display in the range between ¼ and 1/10;

FIG. 9f is a diagram showing a diminishing display in the range between 1/10 and 1/20;

FIG. 9g is a diagram showing a diminishing display in the range between 1/10 and less;

FIG. 11a is a diagram showing undiminished 100% display;

FIG. 11b is a diagram showing a diminishing display in the range between 100% and ½;

FIG. 11c is a diagram showing a diminishing display in the range between ½ and ⅓;

FIG. 11d is a diagram showing a diminishing display in the range between ⅓ and ¼;

FIG. 11e is a diagram showing a diminishing display in the range between ¼ and 1/10;

FIG. 11f is a diagram showing a diminishing display in the range between 1/10 and 1/20;

FIG. 11g is a diagram showing a diminishing display in the range between 1/20 and less;

FIG. 17 is a flowchart showing a significance calculating process;

FIG. 19 is a table showing a content stored in the virtual-plane-position-data storage portion;

FIG. 20 is a table showing a content stored in the action data storage portion;

FIG. 21 is a table showing a content stored in the significance data storage portion;

DESCRIPTION OF THE PREFERRED EMBODIMENTS

The features, advantages, and the like of the present invention will be apparent from the detailed description of the preferred embodiments of the invention which is to be given hereinafter.

Figure 1A:
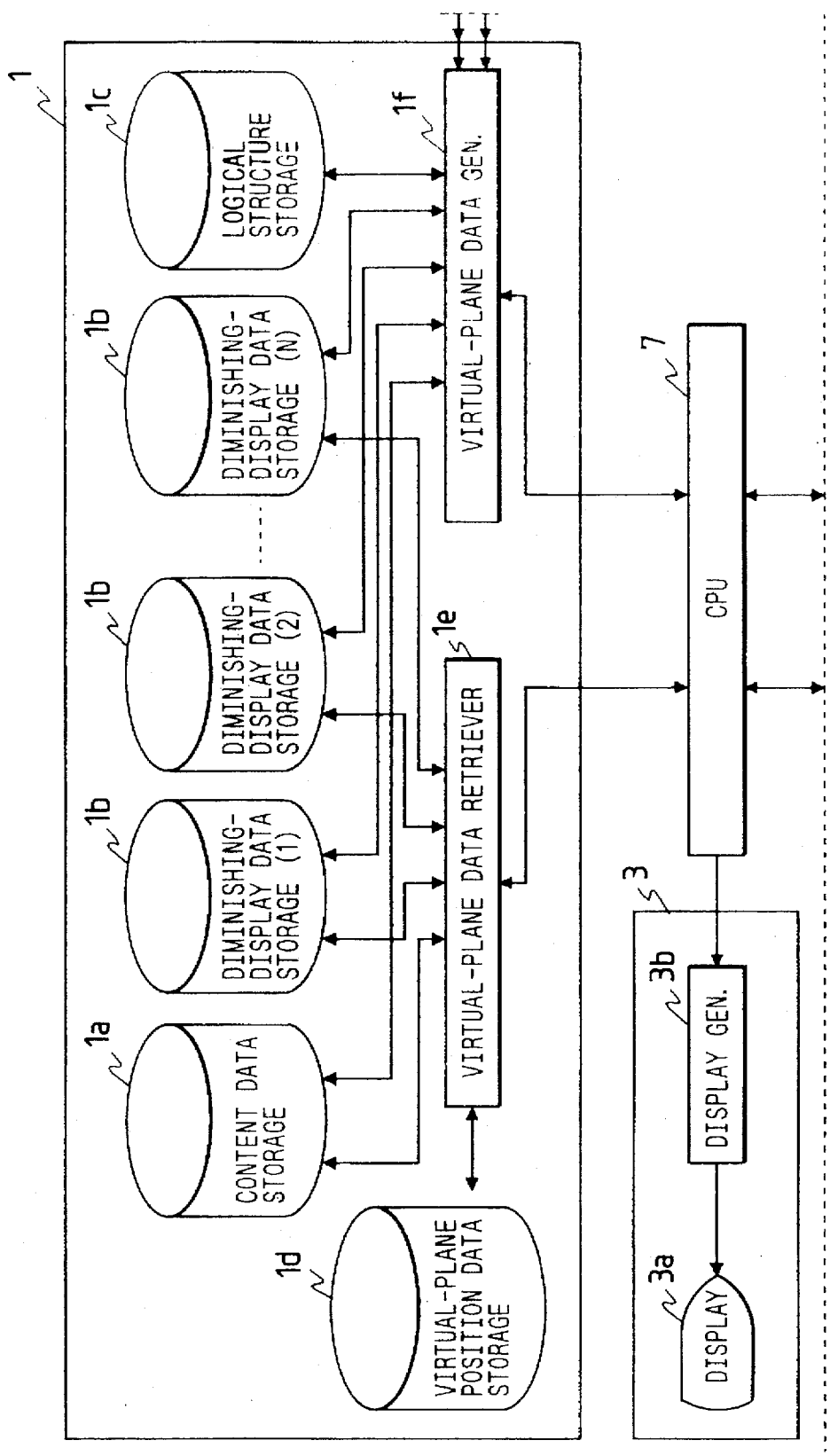
FIGS. 1a and 1b are block diagrams showing the overall arrangement of an information management system according to the present invention.

FIG. 1 is a block diagram showing an overall arrangement of an information management system of the invention.

The information management system, as shown in FIG. 1 includes a virtual-plane-data managing unit 1 for managing a virtual plane which is used for understanding and editing data by a user, a rule storage unit 2 for storing rules on display and edit functions, a display unit 3 for displaying a virtual plane, a virtual scale-factor input unit 4 for inputting the data of a scale factor for display and a display area of a virtual plane, an edit processing unit 5 for providing an edit function which depends on a scale factor for display of the virtual plane, a rule input unit 6 for inputting rules into the rule storage unit 2, and a central processing unit 7 for processing data transferred among the above units and distributing the data to them.

The virtual-plane-data managing unit 1 includes a content data storage portion 1a for storing the detailed contents of each node, a diminishing-display data storage portion 1b for storing display data of nodes, which are diminished in various levels, a logical structure storage portion 1c for storing the logical structures in the nodes, a virtual-plane-position-data storage portion 1d for storing the position and size of each node in a virtual plane, a virtual-plane data retriever 1e, which searches the virtual-plane-position-data storage portion 1d on the basis of the display area data in the virtual plane, and fetches data from the content data storage portion 1a or the diminishing-display data storage portion 1b according to the scale factor, and a virtual-plane data generator 1b for preparing data to be stored in the diminishing-display data storage portion 1b on the basis of the data in the content data storage portion 1a.

Figure 1B:
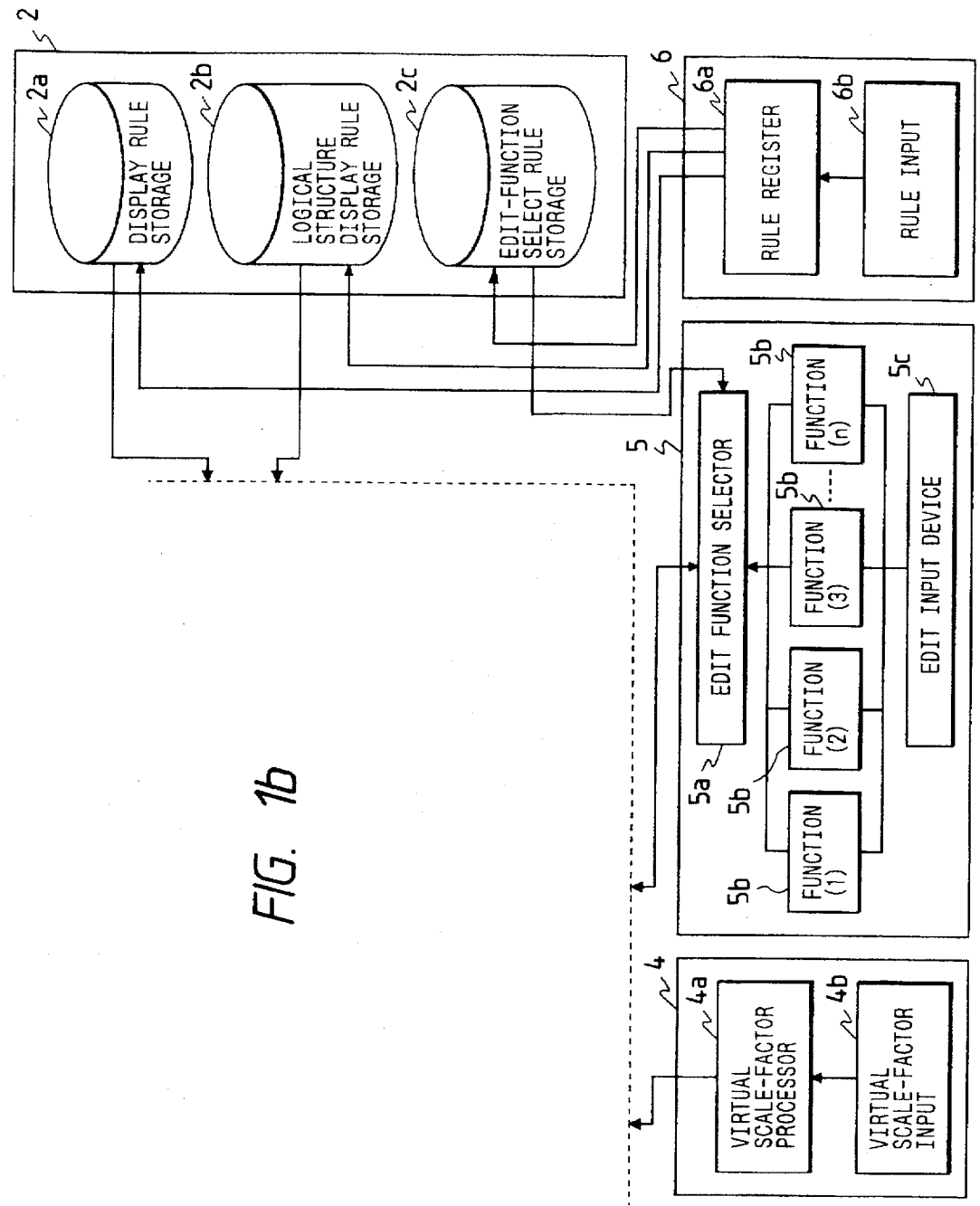

As shown in FIG. 1b, the rule storage unit 2 includes a display rule storage portion 2a for describing rules for preparing diminishing display data according to the contents data of each node, a logical-structure-display-rule storage portion 2b for storing the rules for the display based on a logical structure, and an edit-function-select-rule storage portion 2c for providing edit functions according to the display contents.

The display unit 3 includes a display 3a for an actual visual presentation, and a display generator 3b for composing display data of each node into graphics on the display surface, and sending it to the display 3a.

The scale-factor input unit 4 includes a virtual scale-factor processor 4a for converting data entered from the input unit by a user into the data of a display area and a scale factor of a virtual plane, and a virtual scale-factor input device 4b for receiving the data of a scale factor and a display area both being entered by a user.

The edit processing unit 5 includes an edit function selector 5a for selecting an edit function suitable for a display state according to an edit function select rule, (edit) functions 5b for actual edit processing, and an edit input device 5c for receiving edit processing input from a user.

The rule input unit 6 includes a rule register portion 6a for storing various rules in a rule storage portion, and a rule input device 6b for receiving rules data from a user.

The operation of the information management system thus constructed will be described below.

Figure 2:
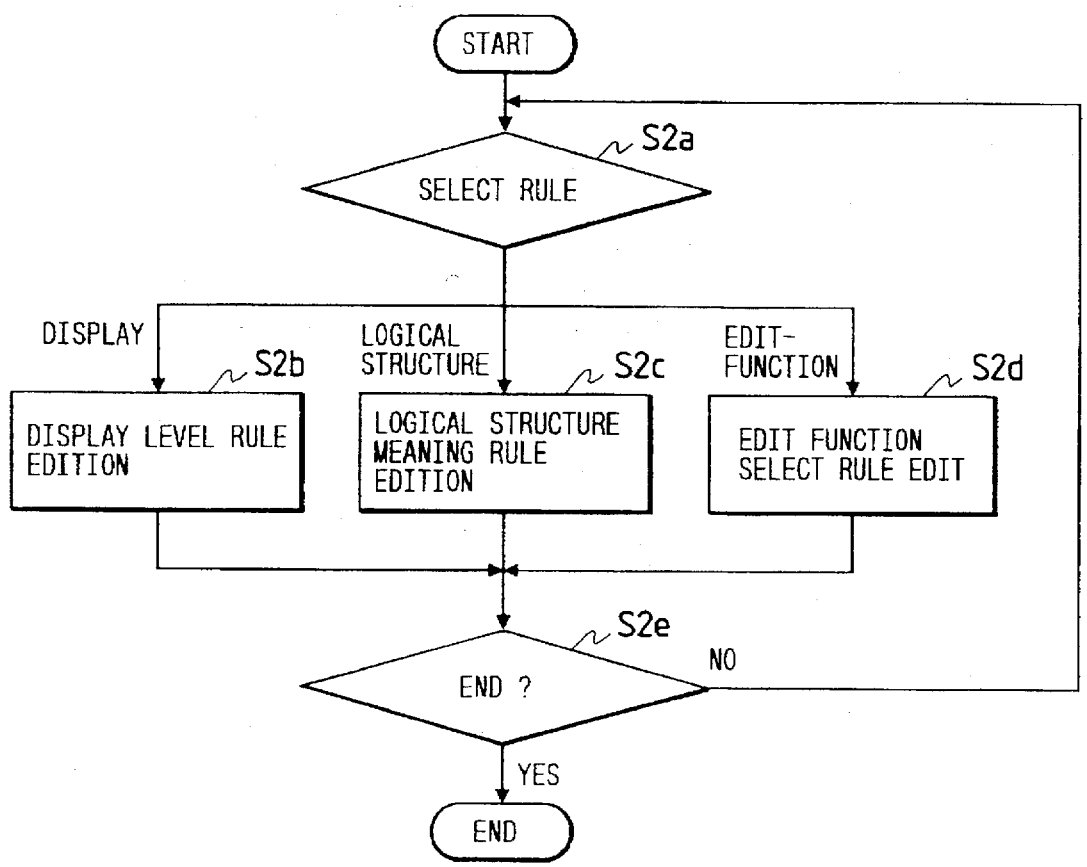
FIG. 2 is a flowchart showing a rule input process.

To begin with, a user enters a display rule, a logical structure display rule, and an edit function select rule according to a flowchart shown in FIG. 2. The user selects rules to be entered (step S2a), and enters the selected rules (step S2b, S2c or S2d), and completes the rule select operation (step S2e). The rules thus entered are stored in the display rule storage portion 2a, logical-structure-display-rule storage portion 2b, and edit-function-select-rule storage portion 2c in the forms as shown in FIGS. 3, 4, and 5.

A process in which actual node data is entered and data for diminishing display is formed will be described with reference to the flowchart of FIG. 6. It is assumed that the position data of the data of each node has been stored into the virtual-plane-position-data storage portion 1d, and contents data has been stored in the content data storage portion 1a, through the edit processing that is carried out by the edit processing unit 5. The virtual-plane data generator 1f searches not-processed nodes (nodes not containing diminishing display data) which are stored in the content data storage portion 1a (step S6a).

The same step selects one of the searched nodes, and sets it as an object to be diminished (step S6b).

A counter X is reset to 0. It researches the related display rule in the display rule storage portion 2a (see FIG. 3, step S6d).

A table of FIG. 3 exemplarily showing the display rules describes how to display character, graphics, and tables. As shown, the size of the node is divided into seven display levels. The rules for displaying character, graphics, and tables are prescribed for those levels. For the node which is to be displayed in the display level of standard or higher, the display rules for the character are as follows. If a plurality of fonts are provided for the character, it is displayed using all the fonts. The character, if it must be modified, is modified. For the graphics, all the attributes of it are displayed. For the table, all the contents of it are displayed. For the node of which is to be displayed in the display level within the range from the standard and ½, a single font is used for the character or the table, and no character modification is used. The display rules shown in FIG. 3 are constructed such that as the scaling factor for display becomes larger, the character, graphics, and table are simpler when displayed. In lower display levels, for example, $\frac{1}{10}$–$\frac{1}{20}$, only presence of the display object is displayed. This is done for all the display objects, character, graphics, and tables. In the display level, or the scale factor, lower than the above, nothing is displayed.

The display information of constituents of the node content is converted according to the display rules as stated above. The result of the conversion is stored into the diminishing-display data storage portion (X) 1b (step S6e).

When progression of the conversion does not reach the diminishing-display data storage portion (N) (step S6f), the node display data previously stored in the diminishing-display data storage portion (X) is set as an object to next be diminished (step S6g).

Then, X is incremented (step S6h), and the sequence of process steps subsequent to step S6d is repeated. The process sequence is repeated for the remaining nodes. When the nodes not yet processed are absent, the diminishing display generation process ends (step S6i). The displays thus processed progressively change as illustrated in FIGS. 7a through 7g.

Figure 8:
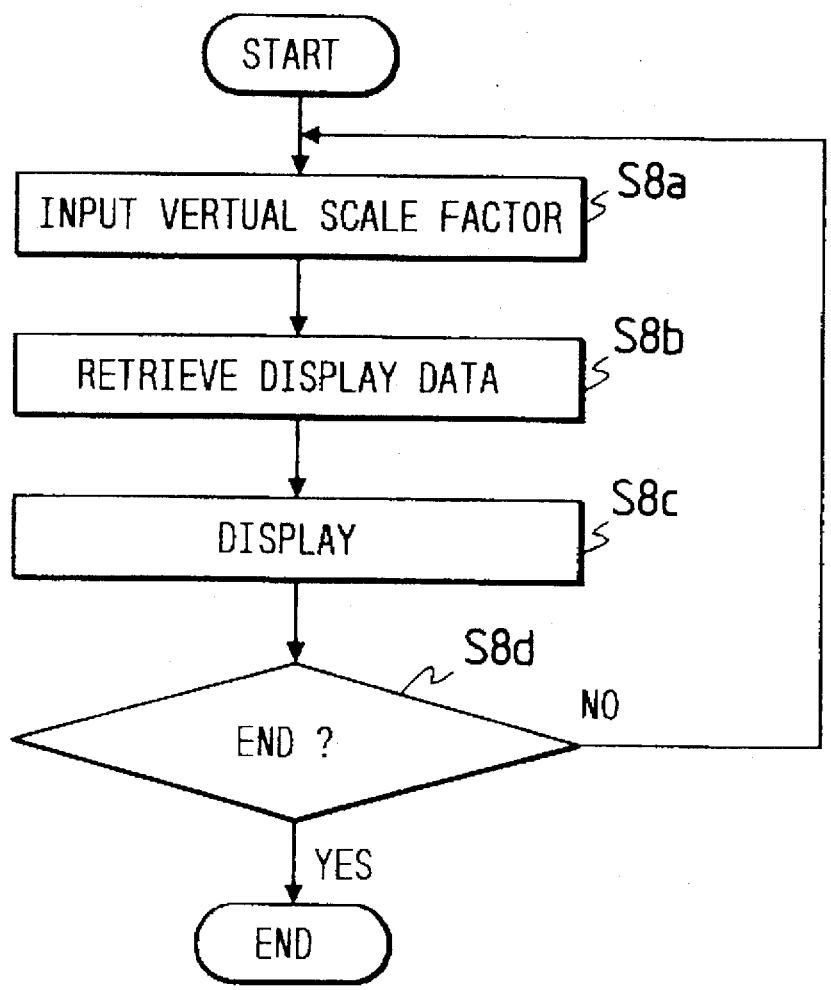
FIG. 8 is a flowchart showing a diminishing display generation process.

The operation for the display will be described with reference to the flowchart of FIG. 8 showing. A user enters the data of a scale factor for display and a display area from the virtual scale-factor input device 4b shown in FIG. 1. Then, the input device 4b sends the received data to the central processing unit 7 (step S8a).

The central processing unit 7, after receiving the data, transfers the data to the virtual-plane data retriever 1e. The virtual-plane data retriever 1e searches the virtual-plane-position-data storage portion 1d on the basis of the display area data, and picks up therefrom the nodes within the display area.

Then, the virtual-plane data retriever 1e selects the data fit to the scale factor, from among the data stored in the content data storage portion 1a and the diminishing-display data storage portion 1b, and sends all items of the diminishing display data of the nodes fit to the scale factor to the central processing unit (seep S8b).

The central processing unit 7 transfers the data to the display generator 3b. The display generator 3b composes all items of the diminishing display data of the received nodes, and adjusts the data so that it has the size specified by a user, and displays it by the display 3a (step S8c).

Figure 9A:
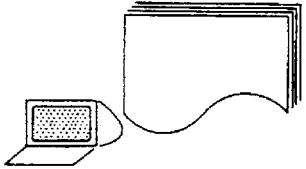
FIGS. 9a through 9g exemplarily showing a series of window displays.
Figure 9B:
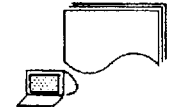
Figure 9C:
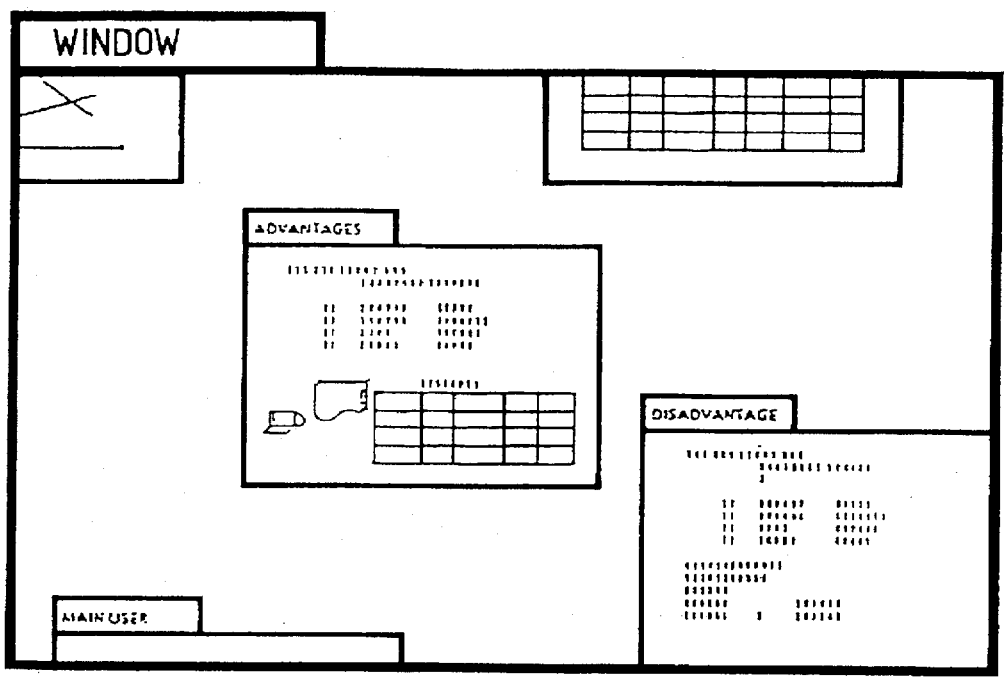
Figure 9D:
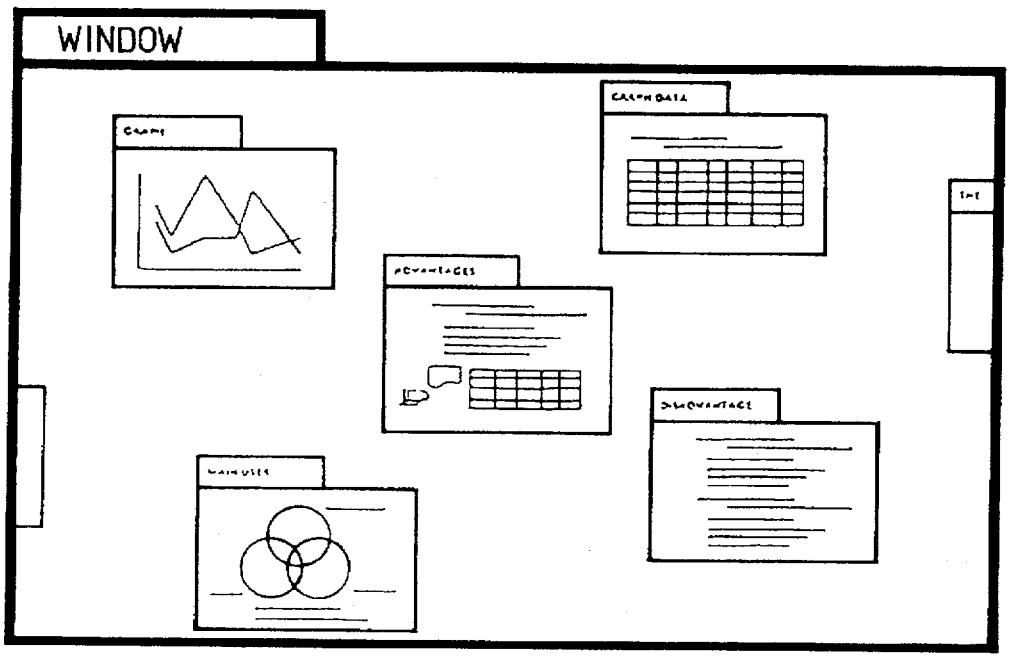
Figure 9E:
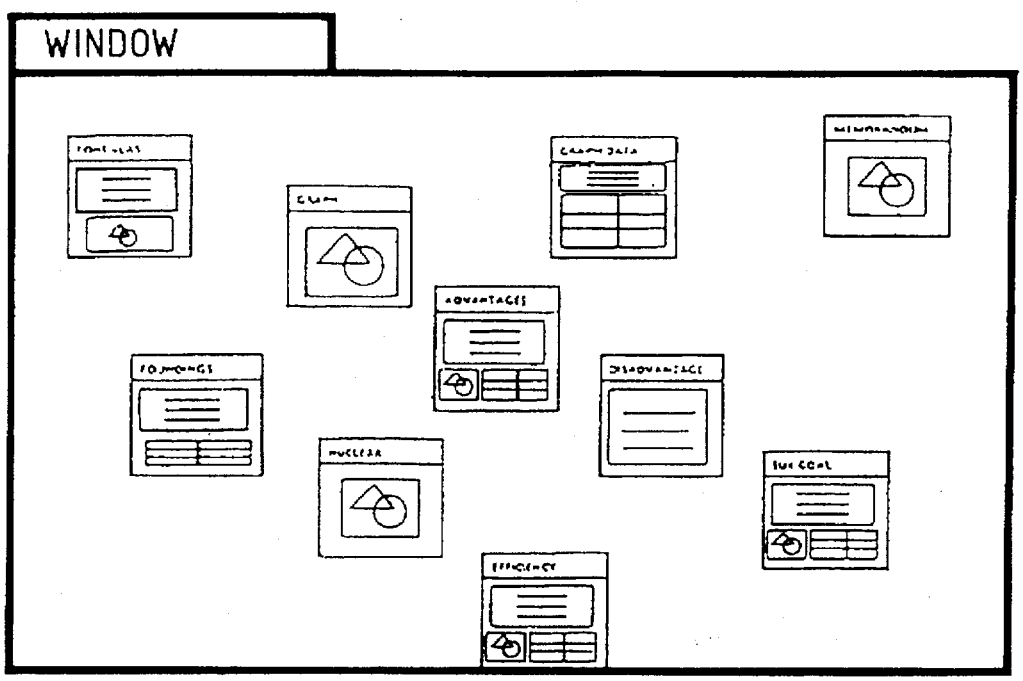
Figure 9F:
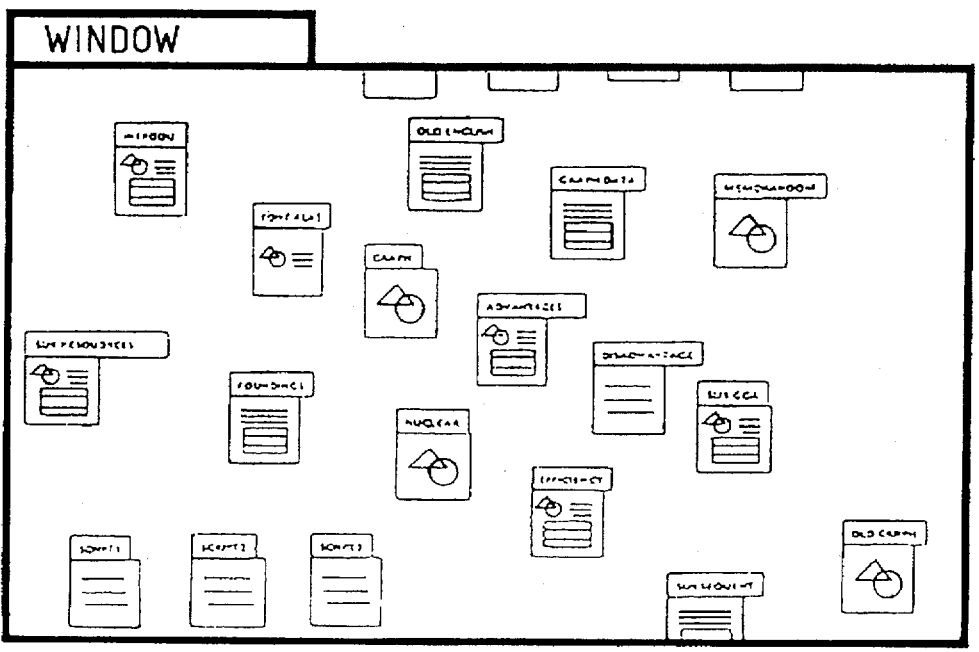
Figure 9G:
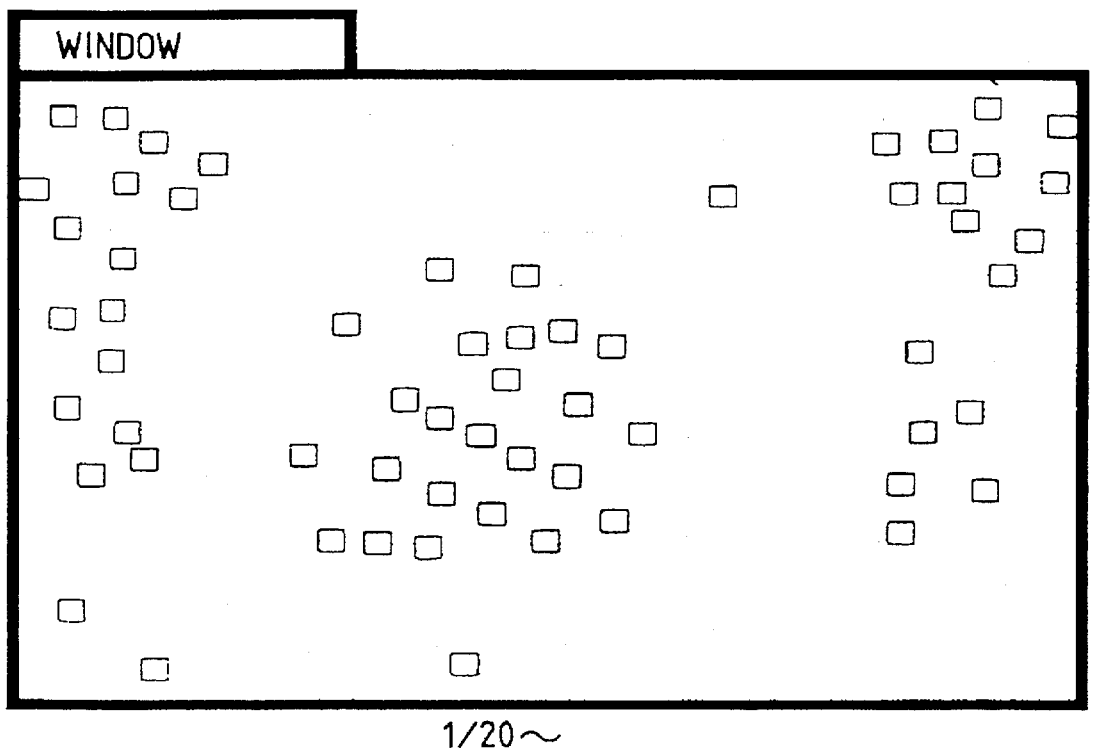

Subsequently, the sequence of the processing steps is repeated until an end request from the user arrives (step S8d). As a result, windows as shown in FIGS. 9a and 9b are presented. The user can see the window at a desired scale factor.

Figure 10:
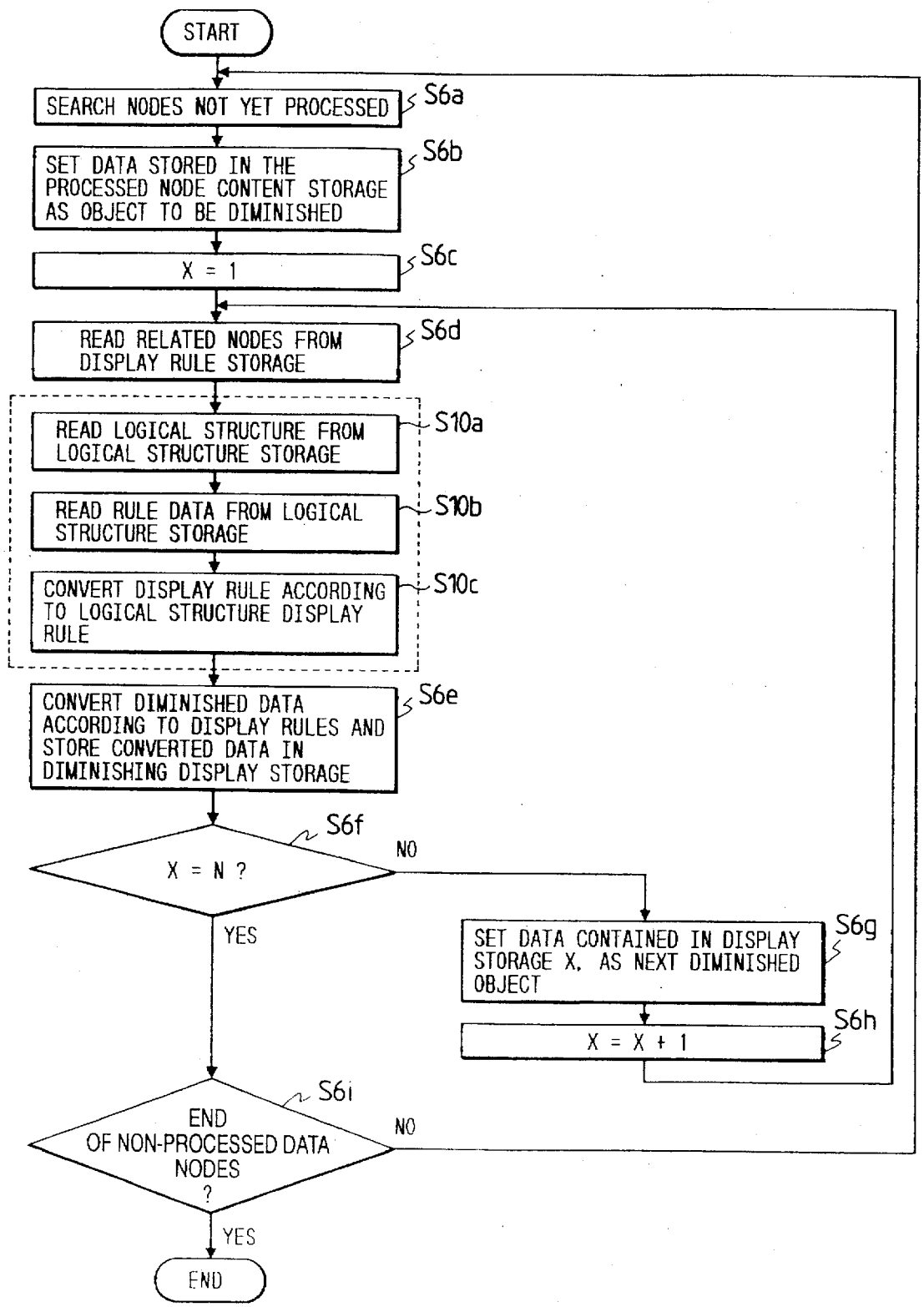
FIG. 10 is a flowchart showing a diminishing display generation process designed taking the logical structure into consideration.
Figure 11A:
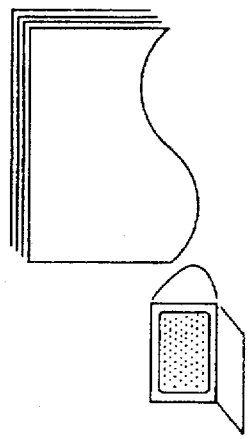
FIGS. 11a through 11g exemplarily show the diminishing display generation process.
Figure 11B:
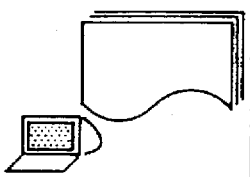
Figure 11C:
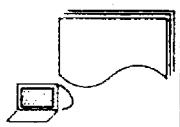
Figure 11D:
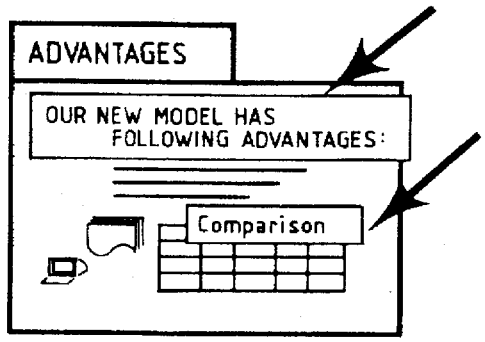
Figure 11E:
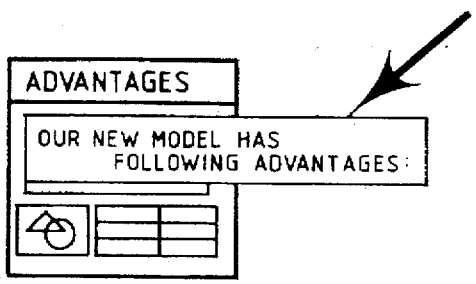
Figure 11F:
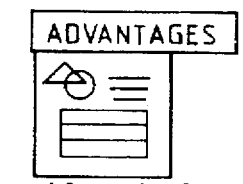
Figure 11G:

The operation of the information management system to properly present a virtual plane display according to the logical structure of the data in each node will be described using a flowchart shown in FIG. 10. The flowchart of FIG. 10 is the same as that of FIG. 6 for the diminishing display generation except for the portion enclosed by a dotted line.

Figure 6:
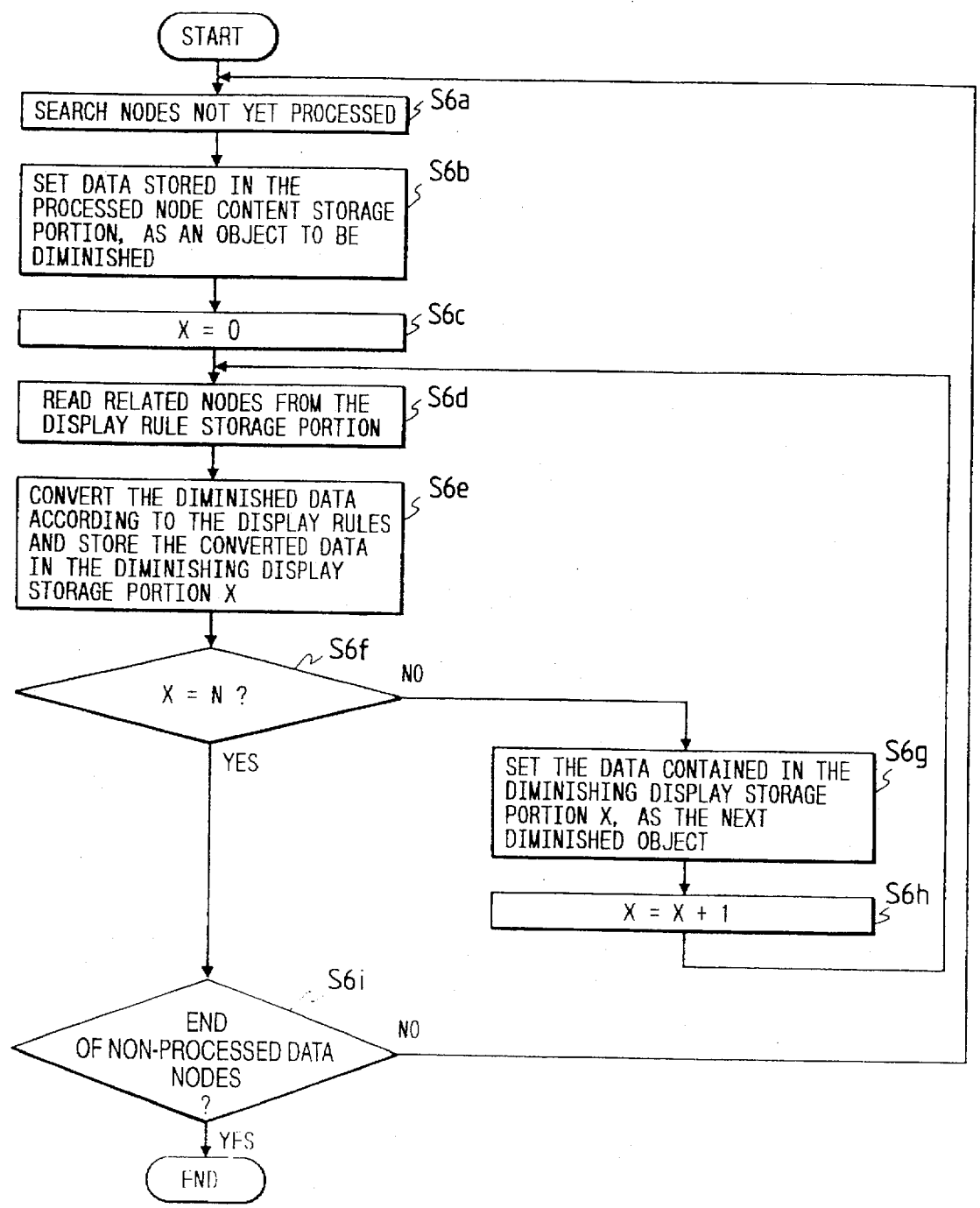
FIG. 6 is a flowchart showing a diminishing display generation process.
Figure 7A:
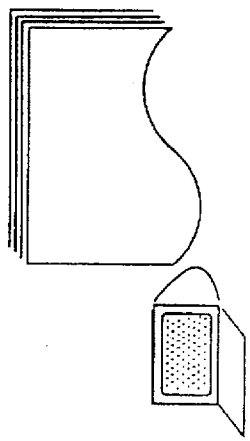
Figure 7D:
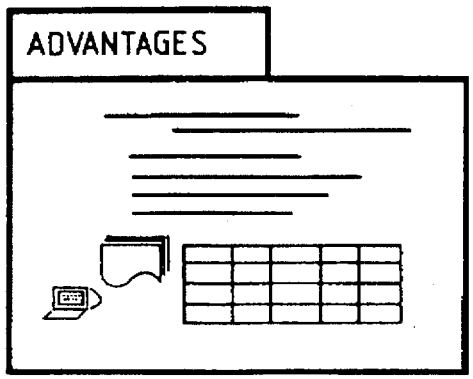
Figure 7E:
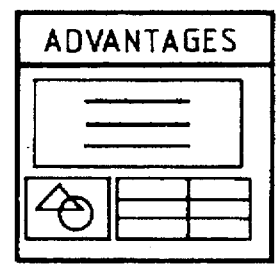
Figure 7F:
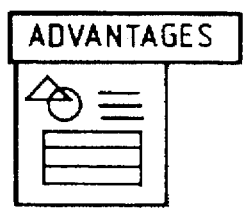
Figure 7G:

The process progresses from step S6a to step 6d as in the flowchart of FIG. 6. Then, control reads the logical structure of the node under processing from the logical structure storage portion 1c (step 10a). Further, control reads the logical structure display rule from the logical-structure-display-rule storage portion 2b (step S10b). FIG. 4 is a table showing an example of the logical structure display rule. The table shows how to display each title within the logical structure for the display levels.

Control modifies the display rule obtained in step S6d according to the later display rule (step S10c). Thereafter, control performs exactly the same process sequence subsequent to step S6e as shown in FIG. 6, thereby obtaining diminishing display data. Under this condition, the display based on the logical structure can be carried out according to the flowchart of FIG. 8. The diminishing display thus prepared is shown in FIGS. 11a to 11g.

Figure 12:
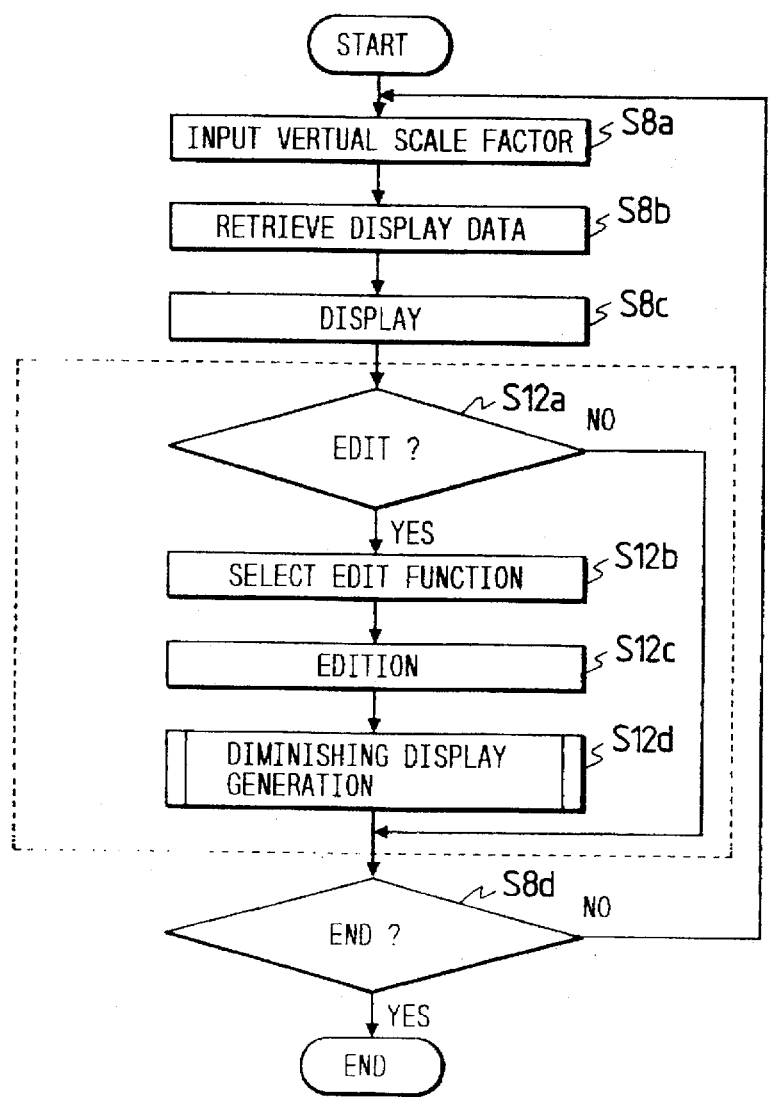
FIG. 12 is a flowchart showing a display and edit process.

The operation for selecting a proper edit function in accordance with a display state in the virtual plane will be described using a flowchart shown in FIG. 12. The flowchart of FIG. 12 is the same as that of FIG. 8 for the diminishing display generation except the portion enclosed by a dotted line.

The process sequentially progresses from step S8a to step S8c in the same manner as of FIG. 8. Following the display in step S8c, control may enter the execution of an edit process (Step S12a). At this time, control retrieves, on the basis of the current scale factor, the edit function select rules that are stored in the edit-function-select-rule storage portion, and determines the function to currently be used from among the (edit) functions (1) to (n) (step S12b). In an example of the edit function select rule shown in FIG. 5, the size of the displayed node is divided into seven display levels as in the case of FIG. 3. Various types of edit functions, such as, Node movement, Node copy, and Node name change are selectively used for each display level, as shown.

The edit functions thus selected are presented for a user, and the user performs an edit using the edit functions (step S12c). Then, the diminishing display generation job described in the flowchart of FIG. 6 or 10 is started (step S12d). Then, a process similar to that shown in the flowchart of FIG. 8 is executed again. As the result of the processing as stated above, the edit functions fit to the present display state are presented.

A second embodiment of the present invention is equivalent to the first embodiment modified so as to additionally include the structure to automatically generate node significance data and to reflect it in the node display in the virtual plane.

Figure 13:
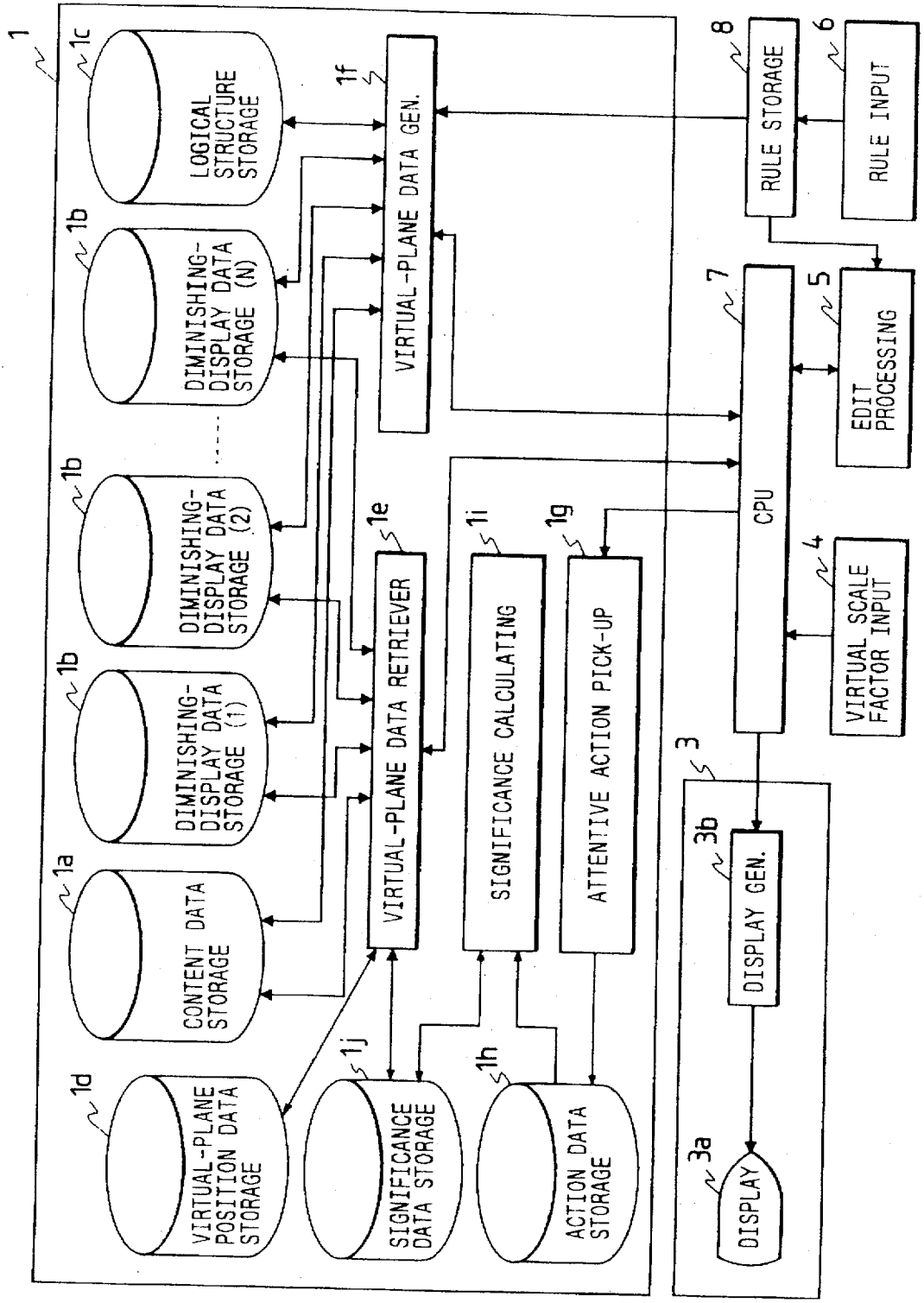
FIG. 13 is a block diagram showing the overall arrangement of the second embodiment of the present invention.

FIG. 13 is a block diagram showing the second embodiment of an information grasping system according to the present invention. The arrangement of the second embodiment of the invention is different from that of the first embodiment in that the construction for managing node significance data is additionally provided in the virtual-plane-data managing unit 1, and a display state of node is controlled by the significance data in the display generator 3b. The construction for managing the node significance data is comprised of an attentive action pick-up portion 1g for picking up actions considered as attentive actions, an action data storage portion 1h for storing the picked up attentive actions, a significance calculating portion 1i for generating the content of the action data storage portion 1h on the basis of the content of the action data storage portion 1h, and a significance data storage portion 1j for storing significance of each node that is calculated by the significance calculating portion 1i.

The following description is elaboration of a process in which a user understands the nodes allocated in a virtual plane through zoom-in and out operations, calculates significance of each node on the basis of the obtained action data, and displays it as navigation information. For the description, reference is made to the flowcharts of FIGS. 14, 15, and 16.

Figure 18:
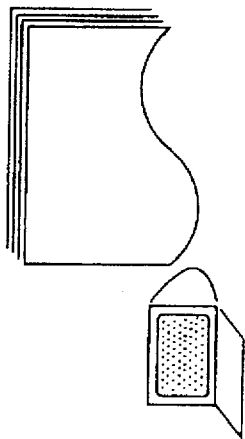
FIG. 18 is a diagram showing an example of a content stored in the content data storage portion.

The node data in a virtual plane are stored into the respective storage portions. The content as shown in FIG. 17 is stored into the content data storage portion 1a. Position data is stored into the virtual-plane-position-data storage portion 1d in the form of a table containing node IDs in connection with their coordinate values representative of their node positions as shown in FIG. 18. Significance data is stored into the significance data storage portion 1j in the form of a table containing node IDs in connection with their coordinates values shown in FIG. 19. Unless a writer of information intentionally specifies a significance of a particular node, all the nodes have equal significance in the initial stage.

The operation to display the virtual plane will be described using a flowchart of FIG. 14. A user enters scale factor data and position data from the scale-factor input unit 4. The input unit sends the received data to the central processing unit 7 (step S14a).

Upon receipt of the data, the central processing unit 7 transfers the data to the virtual-plane data retriever 1e. Then, the retriever searches the virtual-plane-position-data storage portion 1d and the significance data storage portion 1j, and reads the node to be displayed therefrom.

The virtual-plane data retriever 1d selects the data conforming to the scale factor among from the data in the content data storage portion 1a and the diminishing-display data storage portion (X) 1b, and sends all diminishing display data to the node to the central processing unit (step S14b).

The central processing unit 7 transfers the data to the display unit 3. The display generator 3b of the display unit 3 composes all the diminishing display data of the node into the data of the size specified by the user, and converts the respective nodes of the diminishing display data into display data on the basis of the significance data. The display data is displayed by the display 3a (step S14c).

The central processing unit 7 sends the data on these operations to the attentive-action pick-up portion 1g (step S14d).

The above sequence of operations is repeated until the user generates an end request (step S14e).

The processing above allows the user to observe the virtual plane in a zoom-in and out manner. At the same time, the action data is recorded.

A process to pick up attentive action from the record of action data will be described using a flowchart of FIG. 15.

Figure 16A:
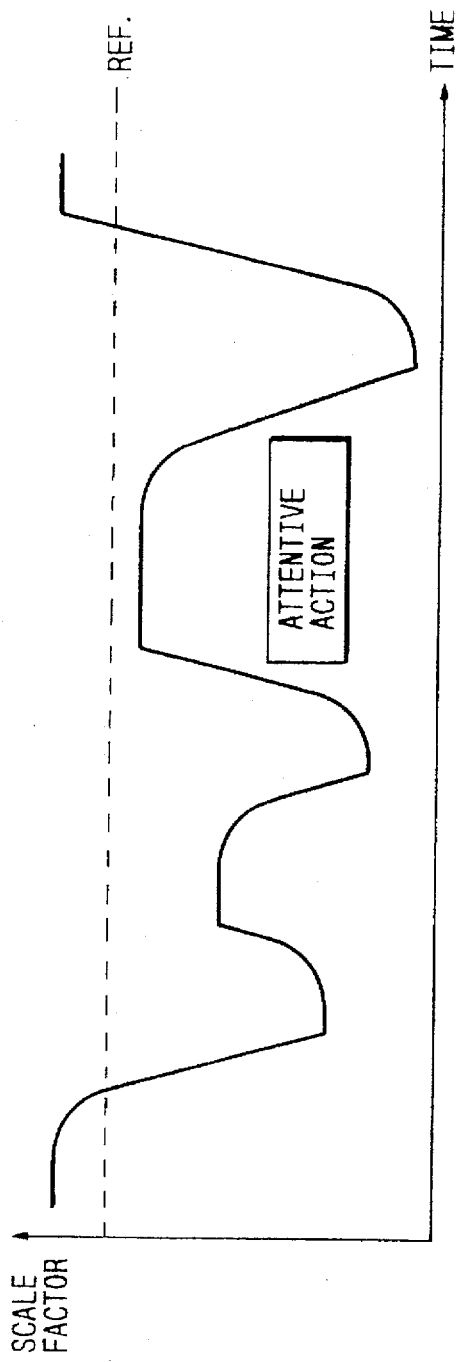
FIG. 16 is a diagram showing attentive actions and unattentive actions, which are discriminated on the basis of the zoom-in/out action by a user.
Figure 16B:
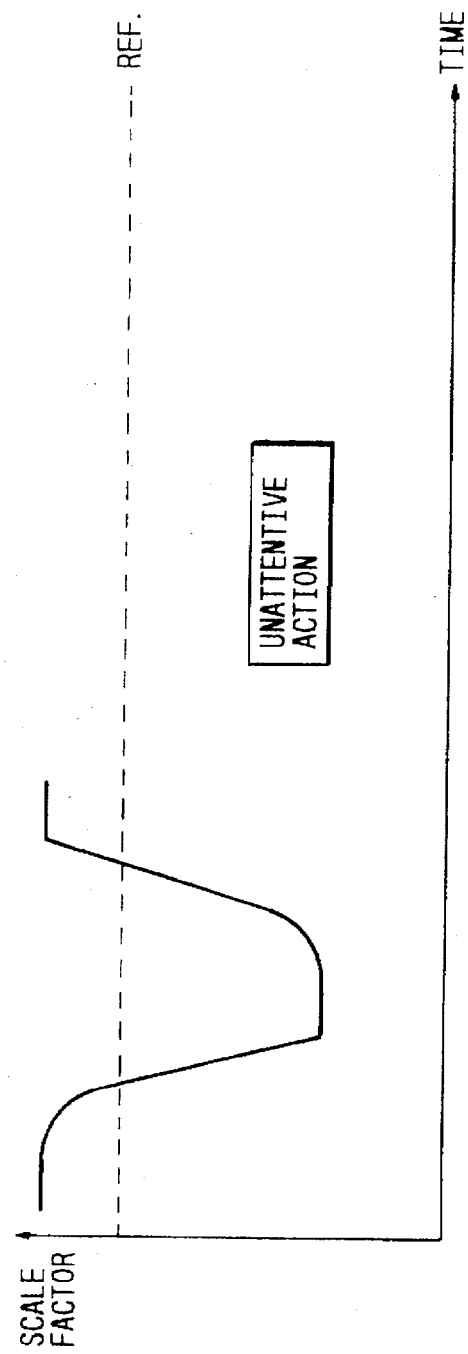

A criterion for determining the attentive action, which is employed in this instance, is at least two times zoom-out operations within a reference scale factor. A time-variation of a virtual scale factor that is entered by a user is shown in FIG. 16. The virtual scale variation of FIG. 16(a) shows that the zoom-out operation is carried out three times within the reference scale factor. The virtual scale variation of FIG. 16(b) shows one time zoom-out operation. First, the attentive action pick-up portion 1g receives the action data from the central processing unit 7 (step S15a), and specifies the node to be processed (step S15b). If it is determined to be attentive action data (step S15c), control increments by one the number of attentive actions of the node corresponding to the action data that is stored in the form shown in FIG. 20, in portion 1h (step S4c).

A process to calculate significance data of each node from the content of the action-data storage portion 1h will be described using a flowchart of FIG. 17. A criterion for determining the significance of a node, which is employed in this instance, is: "All the nodes are arranged in the order of occurrence of attentive actions. One third of those nodes ordered in the higher rank is defined as significance 3, ⅓ of the nodes in the medium rank, as significance 2, and ⅓ of the nodes in the lower rank, as significance 1." At first, all the nodes are sorted in the order of attentive actions (step S16a). Then, the nodes are divided into three groups. The significance of the nodes in each group are determined, and stored into the significance data storage portion 1j (steps S16b, S16c, and S16d). As a result, significance data arranged as shown in FIG. 21 are obtained.

Figure 14:
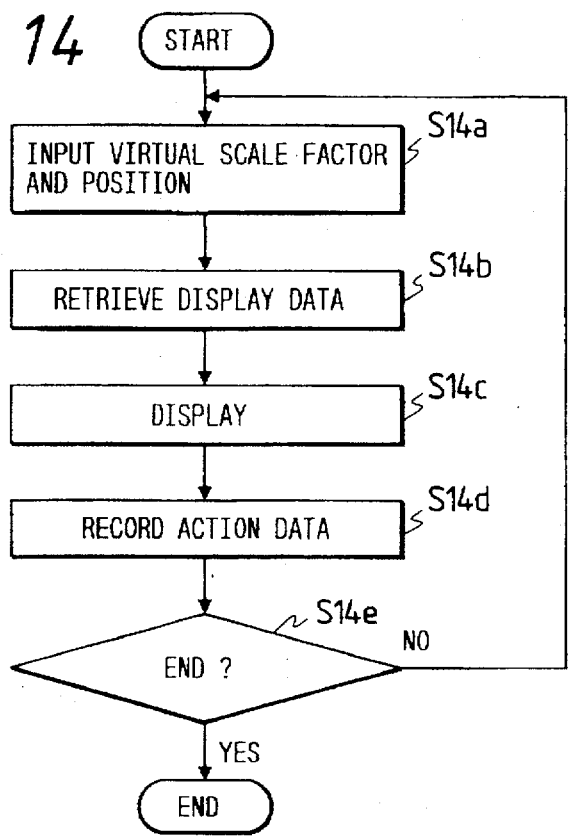
FIG. 14 is a flowchart showing a display process.
Figure 22:
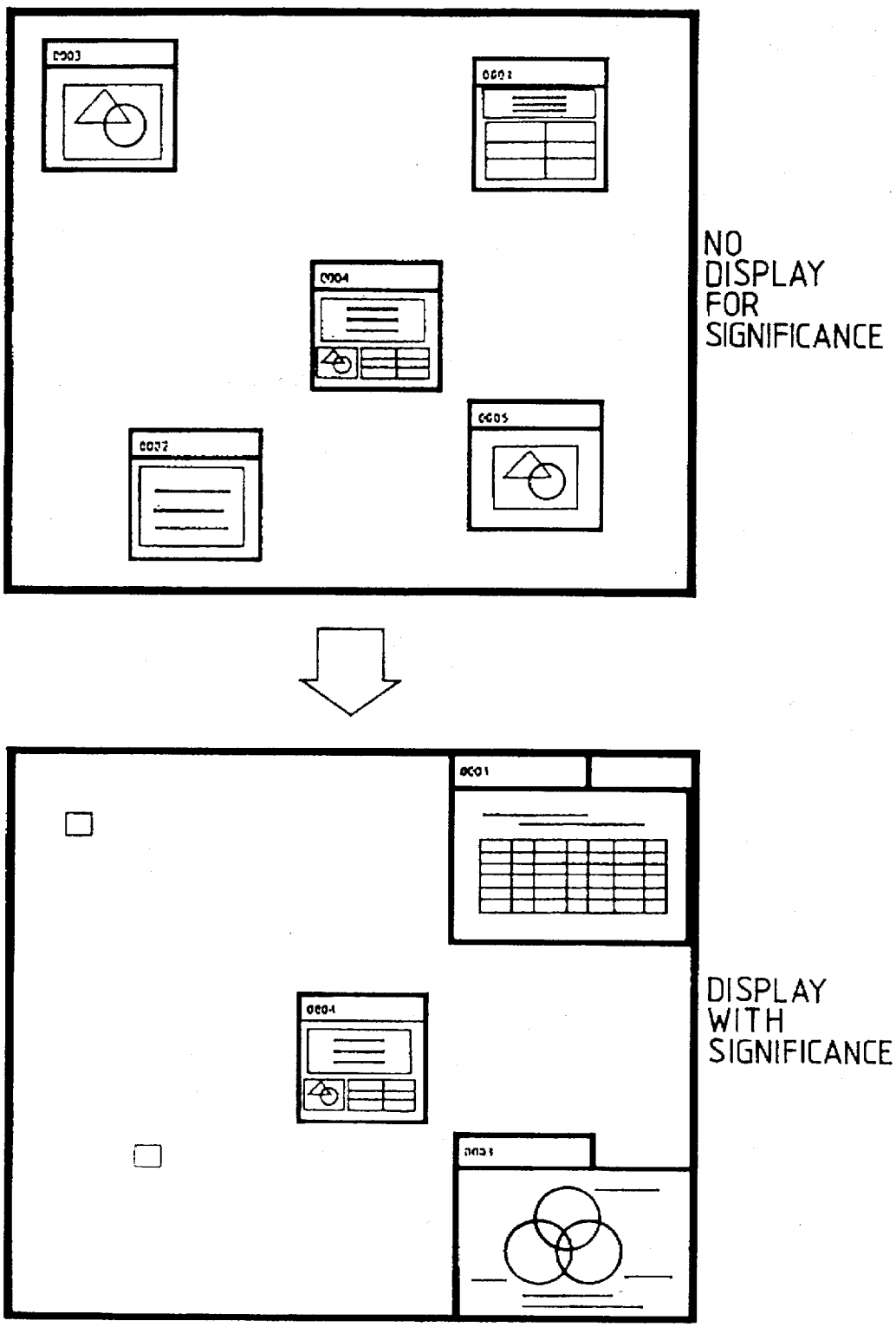
FIG. 22 is a diagram showing displays on the display surface, the displays containing the significance.

Following the processing as just mentioned, the display job of the flowchart of FIG. 14 is executed, so that a display containing the node significance as shown in FIG. 22 is presented. In the figure, the significance is expressed in terms of the size of node.

In the description of the second embodiment, the automatic generation of the significance data of nodes and the display of the significance data in the virtual plane, which are not contained in the first embodiment, are referred to while the same portion of the second embodiment as that of the first embodiment was not referred to. It is evident that the second embodiment is based on the first embodiment. Accordingly, the second embodiment has the function of the display based on the display rules, which is the feature of the first embodiment, and the function of the display of reliable significance data of nodes as well.

A third embodiment of the invention is equivalent to the second embodiment simplified such that it has the functions to automatically generate node significance data and to display the data, but has not the display means operating according to the display rules of the display rule storage portion.

Figure 23:
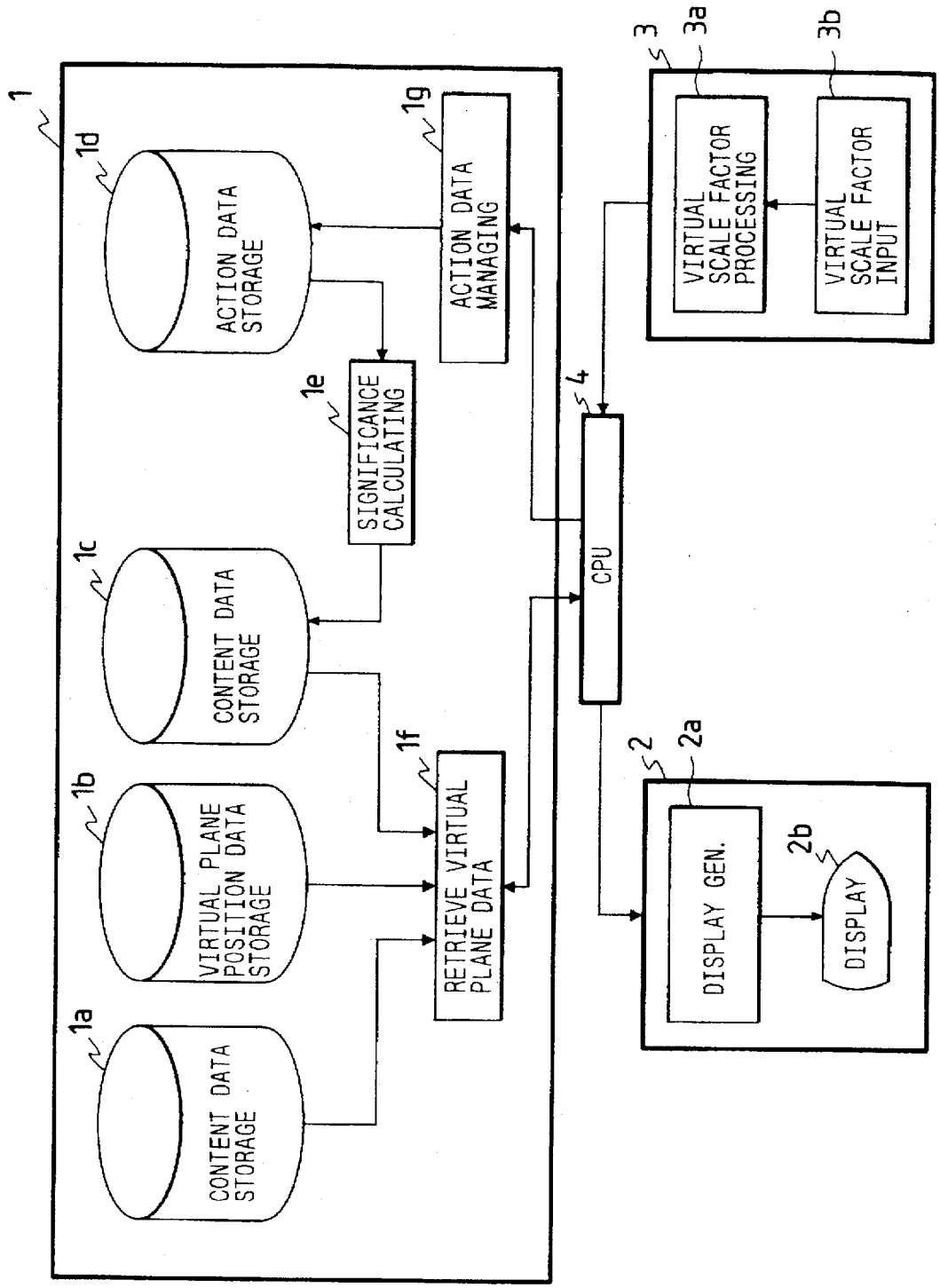
FIG. 23 is a block diagram showing the overall arrangement of the third embodiment.

FIG. 23 is a block diagram showing the arrangement of the third embodiment.

An information management system of the second embodiment includes a virtual-plane-data managing unit 1 for generating a virtual plane in which an information writer describes nodes and a user understands the nodes, and calculates significance data of the nodes on the basis of past action data of users. The information management system further includes a display unit 2 for displaying a virtual plane containing significance data of nodes, a virtual scale factor input unit 3 for entering scale factor data and position data for displaying a virtual plane, and a central processing unit 7 for controlling the data processing operations of those units.

The virtual-plane-data managing unit 1 includes a content data storage portion 1a, a virtual-plane-position-data storage portion 1d, a node-data storage portion 1j, an action data storage portion 1h, a significant calculating portion 1i, a virtual-plane data retrieve/control portion 1k for controlling the content data storage portion 1a, virtual-plane-position-data storage portion 1d, and the node-data storage portion 1j, and retrieving the data of the content, position, and significance of necessary nodes in response to a request from the central processing unit, and an attentive-action pickup portion 1g. In FIG. 23, like reference numerals designate like or equivalent portions in FIG. 13.

A process in which a user actually manages the nodes allocated in a virtual plane in a zoom-in and out manner, and the management system calculates significance of the nodes and visually presents the result as navigation data, will be described below.

The operation to display a virtual plane will be described using the flowchart of FIG. 14 referred to in the description of the second embodiment. A user enters the of scale factor data for display from the virtual scale-factor input unit 4. The virtual scale-factor input unit 4 sends the entered data to the central processing unit 7 (step S14a).

The central processing unit 7 transfers the received data to the virtual-plane data retrieve/control portion 1k. The virtual-plane data retrieve/control portion 1k searches the virtual-plane-position-data storage portion 1d and the node-data storage portion 1j, and picks up nodes to be displayed therefrom. Then, it reads the display content from the content data storage portion 1a, and transfers it back to the central processing unit 7 (step S14b).

The central processing unit 7 transfers it to the display unit 3. The display unit 3 composes the received data by the display generator 3b, and displays it by the display 3a (step S14c). As recalled, in the first and second embodiments, in connection with the zoom-in and out operations, the diminishing display is based on the display rules, which depend on virtual scale factors stored in the display rule storage portion. In the third embodiment, the diminishing display is based on a simple analogous diminishing operation which is carried out according to a virtual scale factor.

The central processing unit 7 sends the records of these operations to the attentive-action pickup portion 1g (step S14d).

Subsequently, the above sequence of operations is repeated until an end request from the user is received (step S14e).

The processing above allows the user to observe the virtual plane in a zoom-in and out manner. At the same time, the action data is recorded.

Figure 15:
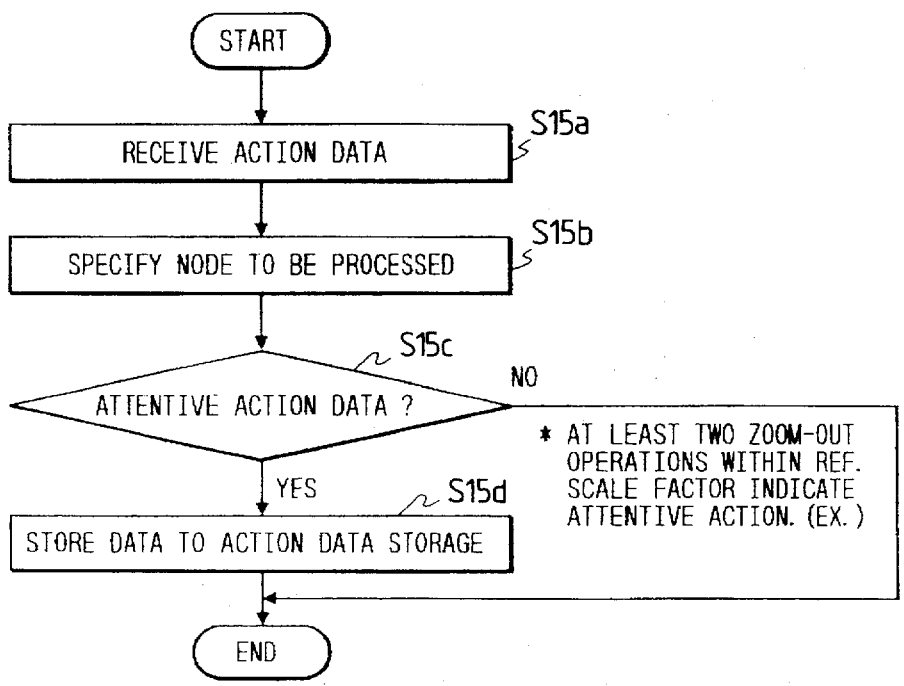
FIG. 15 is a flowchart showing a process to pick up attentive actions.

A process to pick up attentive action data from the record of action data is the same as that described using the flowchart of FIG. 15. The description of the process is omitted here.

A process to calculate the significance data of each node on the basis of the content of the attentive action pick-up portion 1d is also the same as that described using the flowchart of FIG. 17.

As is apparent from the above, information is described as nodes, and the nodes are allocated in a virtual plane. Those nodes are displayed in a single display area. A user can manage and edit the information of nodes while continuously zooming in and out the nodes. Accordingly, the user can arrange and edit the information while visually understanding the relationship of the whole nodes described in the virtual plane and the detailed nodes also described therein. When the information are displayed in a diminished scale, the information is converted into the data acceptable for the display by the computer. This leads to increase of response speed of the system, realizing smooth zoom-in and out operation. Also in the diminishing display, the data is converted to such a degree as to grasp the information. This feature is very convenient when many nodes must be understood at one time, even if the detailed information constituting the respective nodes is lost.

Further, when the information constituting nodes have logical structure is displayed, the diminishing display is carried out according to the logical structure. The diminishing display fit to the logical structure is realized. With this feature, important information can keep its original quantity when it is displayed in a diminished manner.

Furthermore, the present invention has an edit function fit to a display state. This brings about the functions based on a degree of user's attention to the information described in the virtual plane. With this feature, an edit function to edit the whole image, such as movement of nodes is presented in the whole display mode. An edit function to edit the detailed image, such as the contents of nodes, is presented in the detailed display mode. Accordingly, an edit process conforming to the senses of a human being can be realized.

Moreover, the significance of nodes are calculated using user's zoom-in/out action to the nodes, and are displayed. This feature lightens work load of an information writer, and provides reliable navigation data to users. As a matter of course, the fourth embodiment of the invention has the advantages of the first embodiment of the invention.

What is claimed is:

1. An information management system comprising:
    display means, having a screen, including a zooming means for expanding and contracting contents of an information node such that the information management system concurrently displays the contents of the information node and a virtual plane on the screen;
    virtual-plane-data managing means for generating control data to display the virtual plane on the screen of the display means, the virtual plane holding a plurality of information nodes;
    rule storage means for storing rules for displaying the virtual plane and the plurality of information nodes; and
    virtual scale-factor input means for entering a scale factor to scale the display of each of the plurality of information nodes held on the virtual plane.

2. The information management system according to claim 1, wherein said virtual-plane-data managing means includes logical structure storage means for storing logical structures of the information nodes, and said rule storage means includes logic-structure-display-rule storage means for storing rules for display corresponding to the logic structures.

3. The information management system according to claim 2, wherein said rule storage means includes edit-function-select-rule storage means for selecting edit functions according to display states, and wherein the information management system further comprises edit processing means for providing the edit functions according to the edit function select rules.

4. The information management system according to claim 1, wherein said rule storage means includes edit-function-select-rule storage means for selecting edit functions according to display states, and wherein the information management system further comprises edit processing means for providing the edit functions according to the edit function select rules.

5. An information management system comprising:
    display means, having a screen, including a zooming means for concurrently displaying the contents of an information node and a virtual plane on the screen;
    virtual-plane-data managing means for generating control data to display the virtual plane on the screen of the display means, the virtual plane holding a plurality of information nodes, said virtual-plane-data managing means includes attentive action pick-up means for picking up attentive action data for each of the plurality of information nodes, the attentive action data for any given information node being based on the zooming in and out of the given information node, and significance data generating means for calculating significance data of the given information node on the basis of the picked up attentive action data, said virtual plane being displayed reflects the significance data of the plurality of information nodes such that the attentive action data and the calculated significance data substantially indicate that the user actually intended to refer to the given information node instead of mistakenly accessing the given information node;
    rule storage means for storing rules for displaying the virtual plane and the plurality of information nodes; and
    virtual scale-factor input means for entering a scale factor to scale the display of each of the plurality of information nodes held on the virtual plane.

6. The information management system according to claim 5, wherein the attentive action data for the given information node being based upon a plurality of zoom out operations from the given information node.

7. An information management system comprising:
    display means for displaying a virtual plane on a screen thereof, including a zooming means for concurrently displaying on the screen the contents of an information node and a virtual plane, the virtual plane holding a plurality of information nodes;
    virtual scale-factor input means for entering a scale factor to scale the display of each of the plurality of information nodes held on the virtual plane;
    attentive action pick-up means for picking up attentive action data for any given information node based upon the zooming in and out of the given information node during a scale factor entering operation for each of the plurality of information nodes, whereby the attentive action data substantially indicates that a user actually intended to refer to the given information node, instead of mistakenly accessing the given information node;

significance data generating means for calculating significance data of the plurality of information nodes on the basis of the picked up attentive action data; and virtual-plane-data managing means for generating control data for controlling the display of the virtual plane in accordance with said significance data, the virtual plane being displayed in accordance with the significance data of the plurality of information nodes.

8. The information management system according to claim 7, wherein the attentive data for any given information node being based upon a plurality of zoom out operations from the given information node.

9. An information management system comprising:

display means having a screen;

zooming means for expanding and contracting contents of an information node such that the information management system concurrently displays the contents of the information node and a virtual plane on the screen;

virtual-plane-data managing means for generating control data to control the display of the virtual plane on the screen of the display means, the virtual plane holding a plurality of information nodes;

each of the plurality of information nodes having display data selected from the group consisting of text type, graphics type and table type with the display data including, as display data elements, plane information and one or more attributes displaying the plane information in respective fashions;

rule storage means for storing rules for displaying the virtual plane and the plurality of information nodes;

virtual scale-factor input means for entering a scale factor for scaling the display of each of the plurality of information nodes held on the virtual plane; and the rules at least defining which of the display data elements are used for different scale factors inputted by the virtual scale-factor input means.

\* \* \* \* \*